(12) United States Patent
Heubner et al.

(10) Patent No.: US 7,537,292 B2
(45) Date of Patent: May 26, 2009

(54) METHOD FOR REGULATING THE BRAKE POWER ON THE WHEELS OF A SINGLE-TRACK VEHICLE AND BRAKE SYSTEM FOR CARRYING OUT SAID METHOD

(75) Inventors: Wilhelm Heubner, Itzgrund-Kaltenbrunn (DE); Lutz-Gunter Hinrichsen, Fürth (DE); Norbert Oberlack, Höchstadt (DE); Walter Drescher, Ebern (DE)

(73) Assignee: FTE Automotive GmbH (DE)

( * ) Notice: Subject to any disclaimer, the term of this patent is extended or adjusted under 35 U.S.C. 154(b) by 1001 days.

(21) Appl. No.: 10/380,209

(22) PCT Filed: Sep. 13, 2001

(86) PCT No.: PCT/EP01/10591

§ 371 (c)(1), (2), (4) Date: Sep. 8, 2003

(87) PCT Pub. No.: WO02/22417

PCT Pub. Date: Mar. 21, 2002

(65) Prior Publication Data

US 2004/0046444 A1  Mar. 11, 2004
US 2005/0067892 A9  Mar. 31, 2005

(30) Foreign Application Priority Data

Sep. 13, 2000  (DE) .............................. 100 45 541

(51) Int. Cl.
B60T 13/00  (2006.01)
(52) U.S. Cl. ..................................... 303/9.64; 188/344

(58) Field of Classification Search ................. 303/137, 303/113.1, 113.5, 186, 9.64, 9.71, 9.75, 9.61, 303/9.62, 9.63, 9.69, 9.73, 166, DIG. 3, DIG. 4; 188/344, 106 P, 106 R
See application file for complete search history.

(56) References Cited

U.S. PATENT DOCUMENTS 4,664,452 A * 5/1987 Kubota et al. .............. 303/22.8

(Continued)

FOREIGN PATENT DOCUMENTS

DE  29 10 960  2/1980

(Continued)

*Primary Examiner*—Thomas J Williams
(74) *Attorney, Agent, or Firm*—McAndrews, Held & Malloy, Ltd.

(57) ABSTRACT

The invention relates to a method for regulating the brake power on the wheels (VR, HR) of a single-track vehicle, using a brake system comprising a wheel brake circuit ($RBK_{VR}$) having a pressure modulator ($RGC_{VR}$) for regulating the brake pressure $p_{VR}$ on a front wheel brake (54); a wheel brake circuit ($RBK_{HR}$) having a pressure modulator ($RGV_{HR}$) for regulating the brake pressure $p_{HR}$ on a rear wheel brake (54'); at least one control circuit ($STK_{HBZ}$, $STK_{FBZ}$) for controlling both pressure modulators ($RGV_{VR}$, $RGV_{HR}$); and a control unit (94). According to the invention, the brake pressure $p_{HR-nominal}$ in the brake circuit ($RBK_{HR}$) for the rear wheel (HR) is determined according to the brake pressure $p_{VRactual}$ detected in the brake circuit ($RBK_{VR}$) for the front wheel (VR)—taking an ideal brake power distribution characteristic stored in the control unit (94) as a basis—and is regulated for the rear wheel (HR) by means of the pressure modulator ($RGV_{VR}$) in the wheel brake circuit ($RBK_{HR}$). As a result, a method is provided which enables the best possible use of the grip between the tyres and the ground in an automated manner during a brake process. The invention also relates to a simply constructed brake system for carrying out the method.

4 Claims, 8 Drawing Sheets

U.S. PATENT DOCUMENTS

| | | | | |
|---|---|---|---|---|
| 5,470,134 | A | * | 11/1995 | Toepfer et al. .............. 303/9.69 |
| 5,611,606 | A | * | 3/1997 | Nell et al. ................. 303/115.2 |
| 5,816,668 | A | * | 10/1998 | Heubner ................... 303/116.2 |
| 5,887,954 | A | * | 3/1999 | Steiner et al. ............. 303/115.2 |
| 6,238,017 | B1 | * | 5/2001 | Eitel ........................... 303/137 |
| 6,309,029 | B1 | * | 10/2001 | Wakabayashi et al. ..... 303/9.64 |
| 6,338,533 | B1 | * | 1/2002 | Wakabayashi et al. ..... 303/9.64 |
| 6,409,285 | B1 | * | 6/2002 | Wakabayashi et al. ..... 303/9.64 |
| 6,793,295 | B2 | * | 9/2004 | Sakamoto ................... 303/9.64 |
| 2004/0046444 | A1 | * | 3/2004 | Heubner et al. .......... 303/113.5 |

FOREIGN PATENT DOCUMENTS

| | | |
|---|---|---|
| DE | 35 30 280 | 2/1987 |
| DE | 35 30 286 | 3/1987 |
| DE | 36 03 014 | 8/1987 |
| DE | 199 51 535 A1 | 5/2000 |
| EP | 0 451 555 B1 | 5/1995 |
| EP | 0 623 079 B1 | 1/1997 |
| EP | 0 761 520 | 2/2000 |
| EP | 0 687 621 B1 | 4/2002 |

* cited by examiner

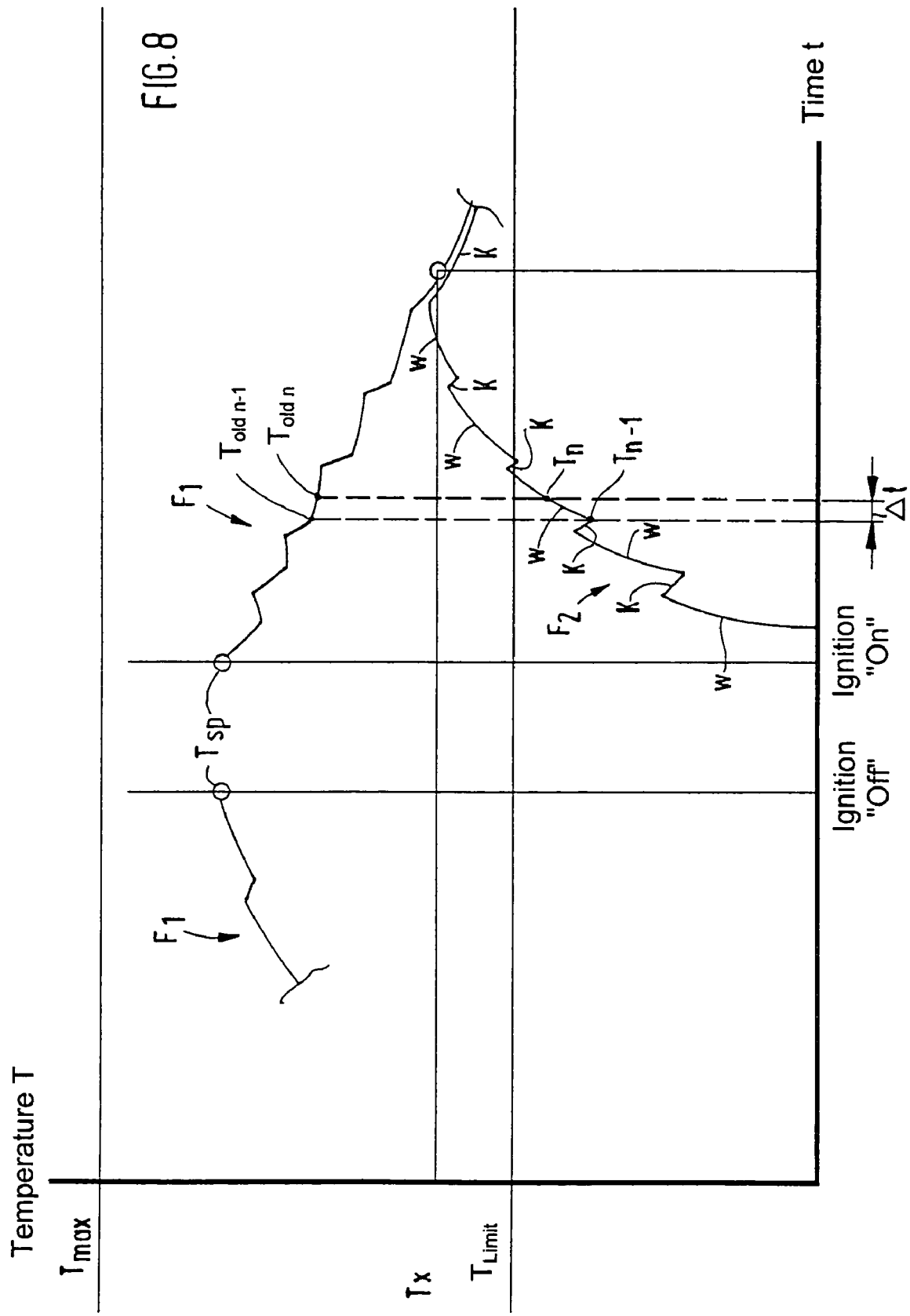

METHOD FOR REGULATING THE BRAKE POWER ON THE WHEELS OF A SINGLE-TRACK VEHICLE AND BRAKE SYSTEM FOR CARRYING OUT SAID METHOD

FIELD OF THE INVENTION

The present invention relates to a method of controlling the braking force at the wheels of a single-track vehicle according to the precharacterising clause of claim 1, and to a brake system for implementing the method according to the precharacterising clause of claim 6. In particular, the invention relates to a brake system for motorcycles, with which the two wheels may be braked independently of one another with the best possible grip close to or on the ideal brake force distribution curve.

BACKGROUND OF THE INVENTION

Vehicles of all types, whether single- or multi-track, undergo a change in the loading of the rear and front axles during braking and acceleration due to physical conditions and their structural features. The consequence is differences in grip and thus different braking actions at the rear and front wheels while braking forces remain constant. These differences in grip may cause overbraking and consequently locking due to the changing, smaller load proportion at the rear wheel during braking, even before the maximum braking force for deceleration may be reached at the front wheels and effectively utilised. This causes track instability and may result in skidding or even swerving of the vehicle in the respective phase. It is thus often no longer possible even for experienced drivers to maintain control of the vehicle, in particular of a motorcycle.

To improve this situation, pressure limiting devices, pressure regulators, load-dependent pressure regulators (e.g. DE-C-29 10 960), pressure-reducing valves, combinations of the above-mentioned components (e.g. EP-B-0 451 555) and electronically controlled ABS, ASR and vehicle dynamics control systems have been used for the rear axle in motor vehicle hydraulic brake systems.

The former components exhibit disadvantages in that, even in the case of load-dependent pressure regulators, a clear distance has to be maintained between the component-specific, stepped characteristic and the ideal characteristic brake force distribution curve, in order on the one hand to absorb the wheel brake system tolerances and on the other hand to avoid the influence of the centre of gravity height, which cannot be detected with conventional load sensing methods—see for example FIGS. 2, 11, 20, 21 and 26 in EP-B-0 451 555.

The same applies to circuits, as known for example from EP-B-0 623 079, in which, although both wheels are activated at the same time when the rear or front wheel brakes are actuated, uniform utilisation of grip is not possible for the stated reasons.

In the case of single-track vehicles already equipped with ABS, i.e. lock-protected, although an ABS modulator is associated with each axle and thus each wheel to achieve the best braking rate, which allows ABS-controlled braking on the ideal characteristic, in such systems (e.g. DE-C-35 30 280, DE-C-35 30 286, DE-C-36 03 014) the minimum achievable braking distance depends to a considerable extent, due to the separate activatability of the ABS modulators, on the instinct and skill of the driver in actuating both modulators as far as possible simultaneously. Moreover, the ideal characteristic curve is only achieved when ABS comes into play; in the case of deceleration markedly below the stability threshold, such systems have no advantages over uncontrolled brake systems.

Furthermore, the conventional behaviour of motorcyclists, which is to actuate predominantly only one brake circuit, stands in the way of achieving both the best possible braking distance and uniform utilisation of the grip at the front and rear wheels. An improvement in this regard was achieved by the circuit (semi-integrated circuit) known from the Applicant's European patent no. EP-B-0 761 520, with which the ABS modulator is activated at the rear wheel automatically when the control valve (=ABS modulator) is actuated at the front wheel. However, even in the case of this improved, driver-relieving circuit arrangement for a non-muscular-energy-assisted brake device equipped with ABS, brake status-dependent variables are not taken into account, such that optimum grip utilisation, allowing the best possible deceleration while overcoming the influence of the driver, is impossible to achieve.

The above-described disadvantages have a serious effect on driver safety, in particular in the case of motorcycles, because in a motorcycle both the static and dynamic axle loads may vary markedly more than in the case of a car, the ratio of admissible total weight to kerb weight is higher, and the ratio of centre of gravity height to wheel base is plainly greater and changes more markedly than in the case of a car with its small wheel load variations and large vibration absorber action, which greatly impairs cornering behaviour of a motorcycle despite its relatively small axle mass.

Finally, the conventional digital pressure regulation using on-off valves found in vehicle dynamics control systems is deemed a disadvantage since the load change impacts thereof generate imbalance in the running gear, in particular when used in motorcycles.

Taking as basis the generic prior art according to EP-B-0 761 520, the object of the invention is to provide a method of controlling the braking force at the wheels of a single-track vehicle, which allows the best possible automated utilisation of the grip between tyre and ground during braking, together with a simply designed brake system for implementing the method.

This object is achieved by the features indicated in claims 1 and 6 respectively. Advantageous or expedient further developments of the invention constitute the subject matter of claims 2 to 5 and 7 to 12.

SUMMARY OF THE INVENTION

According to the invention, in the case of a method of controlling the braking force at the wheels of a single-track vehicle using a brake system which comprises a wheel brake circuit with a pressure modulator for adjusting the braking pressure at a front wheel brake, a wheel brake circuit with a pressure modulator for adjusting the braking pressure at a rear wheel brake, at least one control circuit for activating both pressure modulators and a control unit, the braking pressure $p_{RWnominal}$ in the rear wheel brake circuit is determined as a function of the braking pressure $p_{FWactual}$ detected in the front wheel brake circuit, on the basis of an ideal brake force distribution characteristic stored in the control unit, and is adjusted by the pressure modulator in the rear wheel brake circuit.

As a result, in the case of a semi-integrated brake system or a fully integrated brake system and using the braking pressure in the front wheel brake circuit as a reference input variable, the braking pressure in the rear wheel brake circuit is determined and adjusted automatically in accordance with the ideal brake force distribution, such that optimised utilisation of the grip between tyre and ground is achieved.

In the method according to the invention, the brake force distribution characteristic stored in the control unit may advantageously comprise two ideal brake force distribution curves, one of which curves is representative of an unladen vehicle while the other curve is representative of a vehicle under maximum load.

In addition, a counter representative of the actual loading of the vehicle is preferably produced which, taking account of the two ideal brake force distribution curves, serves in calculating a pressure calculation variable for a braking pressure $p_{FWactual}$ detected in the front wheel brake circuit, which variable lies, in accordance with the actual loading of the vehicle, between or on one of the two ideal brake force distribution curves, wherein the braking pressure $p_{RWnominal}$ is determined for the rear wheel as a function of the calculated pressure calculation variable.

In the case of an advantageous, optional further development of the invention, the measured or calculated temperature of the rear wheel brake disk is also taken into account in determining the braking pressure $p_{RWnominal}$ for the rear wheel, in such a way that the braking pressure $p_{RWnominal}$ is reduced for the rear wheel when given limit temperatures are exceeded.

According to a temperature model that is preferably used, when calculating the temperature of the brake disk when the ignition is "ON", two temperature functions are always produced, one of which temperature functions serves as an auxiliary function, which, after the ignition has been turned "OFF" and "ON" again, always starts at the last calculated temperature value, while the other temperature function supplying the recalculated temperature value always starts at zero again when the ignition is turned "ON", wherein the latter calculates the results of the first temperature function in such a way that it rises more sharply until the two temperature functions supply the same results.

With regard to the device, to implement the above method the invention provides a brake system for single-track vehicles, having a front wheel brake circuit, which comprises a pressure modulator for adjusting a braking pressure applicable to a front wheel brake, a rear wheel brake circuit, which comprises a pressure modulator for adjusting a braking pressure applicable to a rear wheel brake, a first control circuit, by means of which the two pressure modulators may be activated, and a second control circuit, by means of which one of the two pressure modulators may be activated, wherein this brake system is distinguished in that the other of the two pressure modulators may also be activated by means of the second control circuit. Thus, both wheel brake circuits are advantageously always activated upon braking, which results overall in better braking action.

An advantageous further development of the brake system provides that each pressure modulator comprises a valve body, which limits in controllable manner a restriction gap through which a hydraulic fluid is forced to flow during braking, in order to establish in a pressure chamber a defined dynamic pressure which may be applied to the respective wheel brake.

It is preferable for the valve body of each pressure modulator to be activatable electromagnetically and hydraulically via a control piston for adjustment of the restriction gap. The control piston of each pressure modulator may be displaced by the pressurisation of a control chamber and/or by mechanical loading via an activating piston guided slidingly in an activating chamber and loadable hydraulically via the activating chamber. The control piston of each pressure modulator may additionally be displaced by means of a solenoid actuator consisting of an armature on the control piston and a solenoid.

In a preferred embodiment, each wheel brake circuit and each control circuit is provided with a pressure sensor.

The particular advantages of the method according to the invention and the brake system provided therefore are summarised below:

The introduction of effective integrated brakes is made possible, thereby overcoming the driver's individual habits.

The driver of the vehicle is relieved of feel-based adjustment of the brake force distribution and may thus attend more to what is happening with the traffic.

Both brakes are actuated substantially more quickly in emergencies in particular via the handbrake cylinder, which has the effect of shortening the braking distance. This also takes into account the fact that by far the majority of the drivers of two-wheeled vehicles mainly use only one brake.

By implicitly taking into account the dynamic effects, the tendency of the rear wheel to lift up is reduced.

Uniform grip utilisation at the two wheels improves the roll steer effect when braking while cornering.

Running gear imbalances are reduced during onset of braking and braking.

The rear wheel circuit is loaded only proportionally when both brakes are actuated, whereby thermal overloading of brake disk, brake lining and brake caliper no longer occurs at the rear wheel.

Further features and advantages of the invention are revealed by the following description.

BRIEF DESCRIPTION OF THE DRAWINGS

The invention is explained in more detail below with reference to preferred exemplary embodiments and to the attached drawings, in which:

FIG. 8 is a diagram in which the temperature is plotted as a function of time and which serves to illustrate the temperature model according to the invention with two computationally determined temperature curves F1 and F2.

DETAILED DESCRIPTION OF EXEMPLARY EMBODIMENTS

Figure 1:
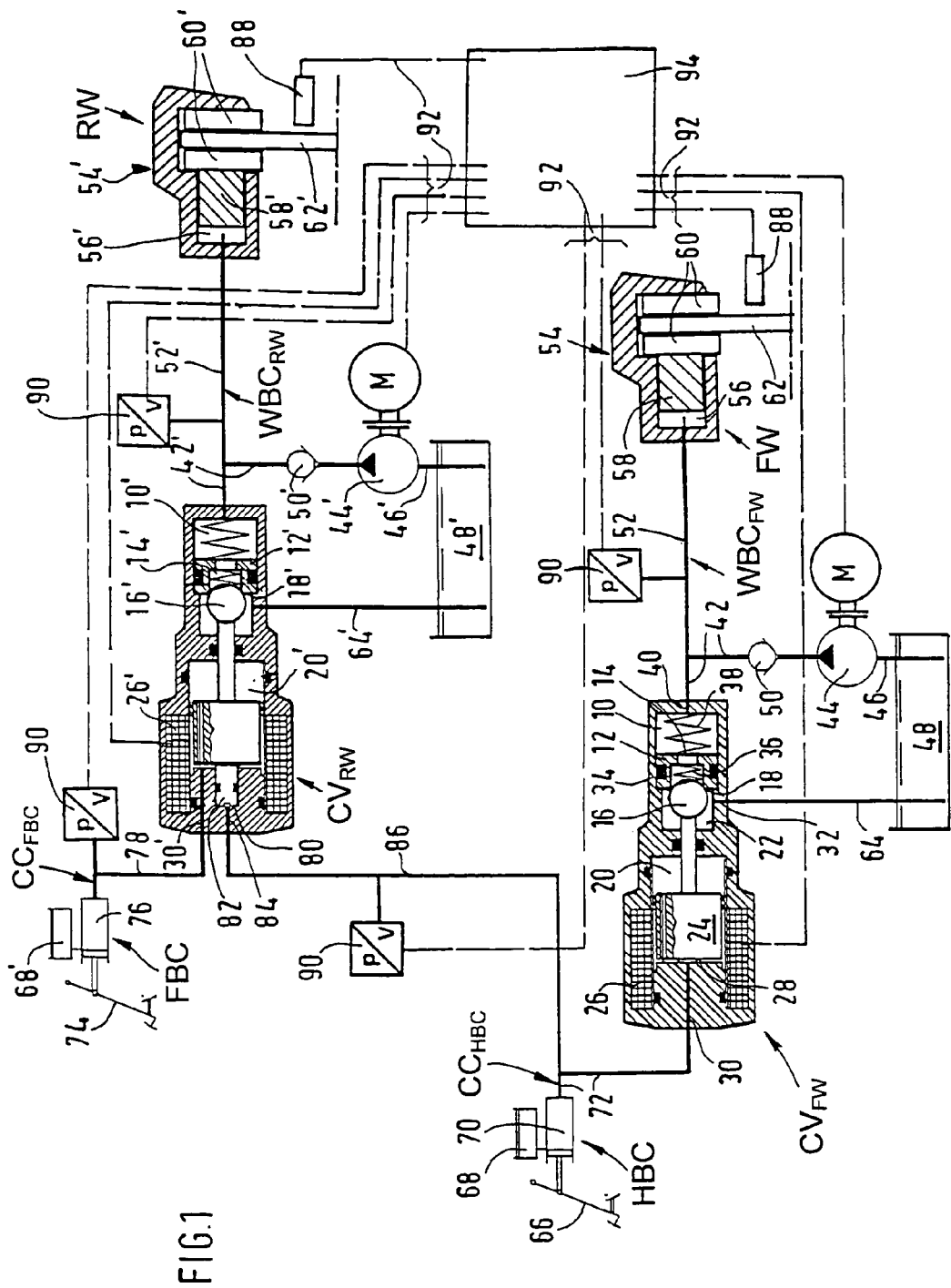
FIG. 1 is a circuit diagram of a hydraulic semi-integrated brake system with antilock braking system (ABS) for motorcycles, for implementing the method according to the invention.

FIG. 1 shows the semi-integrated brake system in the unactuated state. The semi-integrated brake system may be roughly subdivided into a control circuit $CC_{HBC}$, which is associated with a handbrake cylinder HBC, a control circuit $CC_{FBC}$, which is associated with a footbrake cylinder FBC, a wheel brake circuit $WBC_{FW}$ for the front wheel FW and a separate wheel brake circuit $WBC_{RW}$ for the rear wheel RW. Between the control circuit $CC_{HBC}$ and the wheel brake circuit $WBC_{FW}$ there is connected a pressure modulator in the form of a control valve $CV_{FW}$, while between the control circuit $CC_{FBC}$ and the wheel brake circuit $WBC_{RW}$ there is connected a further pressure modulator in the form of a control valve $CV_{RW}$, which differs from the control valve $CV_{FW}$. The control valve $CV_{FW}$ and the control valve $CV_{RW}$ are known with regard to structure and function in principle from the Applicant's European patent EP-B-0 761 520, to which express reference is hereby firstly made.

The very compact control valves $CV_{FW}$ and $CV_{RW}$ are substantially distinguished in that they take the form of a restriction valve, which comprises a pressure chamber 10, in which a valve piston 12 is slidingly arranged. The valve piston 12 has a through-hole 14, at which it forms, together with a valve body 16, a restriction gap 18. In non-muscular-energy-assisted braking, a hydraulic fluid is forced to flow through the restriction gap 18, the restriction gap 18 being adjustable by activation of the valve body 16, such that a defined dynamic pressure is generated in the pressure chamber 10. The dynamic pressure is available to produce a braking force at the front wheel FW or the rear wheel RW in the wheel brake circuit $WBC_{FW}$ or in the wheel brake circuit $WBC_{RW}$ respectively. If the non-muscular-energy assistance is absent, the valve piston 12 may be displaced via the valve body 16 in the pressure chamber 10, wherein the valve body 16 closes the through-hole 14, such that a residual braking pressure is generated in the pressure chamber 10.

The control valves $CV_{FW}$ and $CV_{RW}$ each have a three-chamber valve housing, which, in addition to the pressure chamber 10, defines a control chamber 20 and an outlet chamber 22, which are separated from one another by a wall of the valve housing. A control piston 24 is arranged slidingly in the control chamber 20 and may be displaced in the axial direction of the control chamber 20 by hydraulic activation or, in the case of an antilock braking system (ABS), by electromagnetic activation. To this end, the control piston 24 consists of an armature guided in the control chamber 20 and a valve pin centred relative to the armature, which valve pin extends, sealed by means of a sealing element, through the wall between control chamber 20 and outlet chamber 22 and projects into the outlet chamber 22. The valve pin of the control piston 24 guided in hydraulically sealed manner in the wall between control chamber 20 and outlet chamber 22 has a smaller diameter than the armature of the control piston 24. The control piston 24 may be surrounded substantially completely in the control chamber 20 by the hydraulic fluid, to which end a hole is formed in the armature of the control piston 24, which connects the side of the armature which is on the left in FIG. 1 with the side thereof which is on the right in FIG. 1.

In the portion of the valve housing radially surrounding the control chamber 20 there is arranged a solenoid 26, which surrounds concentrically at least in part the armature of the control piston 24. By means of the solenoid actuator consisting of the armature of the control piston 24 and the solenoid 26, the control valve $CV_{FW}$ or $CV_{RW}$ may be activated to change the restriction gap 18 independently of actuation of the handbrake cylinder HBC or footbrake cylinder FBC, wherein the control piston 24 is displaced axially. For this purpose, the solenoid actuator is designed to have a corresponding, virtually proportional current-force characteristic.

On the side of the control piston armature opposite the outlet chamber 22, in the case of the control valve $CV_{FW}$ illustrated in FIG. 1, a limit stop 28 is constructed in the control chamber 20 or on the armature, which limit stop 28 limits the travel of the control piston 24 in the control chamber 20 to the left in FIG. 1. Finally, the control chamber 20 comprises a connection 30, via which the control piston 24 may be hydraulically activated.

In the outlet chamber 22 there is arranged the valve body 16, which takes the form of a metal ball, upon which force may act mechanically via the valve pin of the control piston 24 extending in sealed manner through the wall between control chamber 20 and outlet chamber 22. The valve body 16 and the valve pin of the control piston 24 are two separate components, such that the valve body 16 may be loaded only with a pressure force via the valve pin of the control piston 24. The outlet chamber 22 is additionally provided with a connection 32, via which the hydraulic fluid may drain out of the outlet chamber 22.

A step 34 is provided between outlet chamber 22 and pressure chamber 10, which step 34 forms a limit stop on the outlet chamber side for the valve piston 12 accommodated in the pressure chamber 10 and lying on an axis with the control piston 24. On the outlet chamber side of the through-hole 14 of the valve piston 12 connecting the outlet chamber 22 hydraulically with the pressure chamber 10 there is fitted an annular seal seat, which, like the through-hole 14, is oriented in centred manned relative to the central axis of the valve piston 12 and interacts with the valve body 16 to limit the restriction gap 18 or comes to rest tightly against the valve body 16 if non-muscular-energy assistance is absent. In the through-hole 14 of the valve piston 12 there is accommodated a restoring spring 36, which is supported on a pressure chamber-side shoulder of the valve piston 12 and forces the valve body 16 against the valve pin of the control piston 24. The valve piston 12 is provided at its outer circumference with a sealing element, such that only the restriction gap 18 hydraulically connects the pressure chamber 10 with the outlet chamber 22 via the through-hole 14 of the valve piston 12 or a residual braking force may be generated in the pressure chamber 10 if non-muscular-energy assistance is absent, once the valve body 16 has closed the through-hole 14 in the valve piston 12 at the seal seat thereof.

In the pressure chamber 10 there is accommodated a piston spring 38, which pretensions the valve piston 12 towards the step 34 of the valve housing with a force which is greater than the restoring force of the restoring spring 36. Finally, the pressure chamber 10 also comprises a connection 40.

In the non-activated state, the control valve $CV_{FW}$—like the control valve $CV_{RW}$—is in the zero throughput position, in which the valve piston 12 is pretensioned via the piston spring 38 against the step 34 of the valve housing, while the restoring spring 36 supported against the shoulder of the valve piston 12 uses the fact that the valve body 16 is resting against the valve pin of the control piston 24 to force the control piston 24 against the limit stop 28 in the control chamber 20, wherein the restriction gap 18 is maximally opened contrary to the illustration in FIG. 1.

The control valve $CV_{FW}$ is then connected as follows into the semi-integrated brake system.

The pressure chamber 10 of the control valve $CV_{FW}$ is connected by its connection 40 hydraulically via a hydraulic line 42 to the output of a hydraulic pump 44 driven by means of a motor M, the input of which hydraulic pump 44 is connected via an intake line 46 to a storage tank 48 for the hydraulic fluid and which produces the forced flow through restriction gap 18 in the case of non-muscular-energy-assisted braking. A non-return valve 50 is connected into the hydraulic line 42, which non-return valve 50 prevents the hydraulic fluid from flowing back towards the hydraulic pump 44. A hydraulic line 52 branches off from the hydraulic line 42 between the non-return valve 50 and the pressure chamber 10 of the control valve $CV_{FW}$, which hydraulic line 52 leads to a brake caliper 54 serving as a brake application member.

The brake caliper 54, in the exemplary embodiment shown a floating caliper, has a piston/cylinder arrangement with a pressure chamber 56, in which a piston 58 is guided in hydraulically sealed manner. The pressure chamber 56 is connected to the hydraulic line 52, such that the piston 58 may be acted upon by the dynamic pressure generated by means of the hydraulic pump 44 and controlled via the control valve $CV_{FW}$. In addition, the brake caliper 54 is provided with brake linings 60, which are pressed against a brake disk 62 by means of the piston 58 when the piston/cylinder arrangement is pressurised.

In addition, the outlet chamber 22 of the control valve $CV_{FW}$ is connected to the storage tank 48 via a return line 64.

Finally, the single-chamber handbrake cylinder HBC serves in hydraulic activation of the control valve $CV_{FW}$ via the control piston 24 guided in the control chamber 20, which single-chamber handbrake cylinder HBC may be actuated by means of a handbrake lever 66 and comprises a pressure chamber 70 connected with an equalising reservoir 68 when the handbrake cylinder HBC is in the unactuated state. To this end, the pressure chamber 70 is connected via a control line 72 to the connection 30 of the control valve $CV_{FW}$.

As a result, the hydraulic pump 44, the hydraulic line 42, the control valve $CV_{FW}$ connected to the storage tank 48 via the return line 64, the hydraulic line 52 and the piston/cylinder arrangement of the brake caliper 54 form a non-muscular-energy wheel brake circuit $WBC_{FW}$ with residual braking function integrated via the closable valve piston 12, which may be activated electromagnetically by means of the solenoid 26 of the control valve $CV_{FW}$ or via the hydraulic control circuit $CC_{HBC}$ separated hydraulically from the wheel brake circuit $WBC_{FW}$, which hydraulic control circuit consists of the handbrake cylinder HBC, the control line 72, the control chamber 20 of the control valve $CV_{FW}$ and the control piston 24 thereof.

The upper part of FIG. 1 shows the components associated with the rear wheel RW, i.e. control circuit $CC_{FBC}$, control valve $CV_{RW}$ and wheel brake circuit $WBC_{RW}$, of the semi-integrated brake system, which will be described below only to the extent to which they differ from the components associated with the front wheel FW, i.e. handbrake cylinder HBC, control valve $CV_{FW}$ and wheel brake circuit $WBC_{FW}$. Similar or corresponding components are here provided with the same reference numerals, primed. The part of the semi-integrated brake system shown in the upper part of FIG. 1 is also illustrated in the unactuated state, wherein the restriction gap 18' of the control valve $CV_{RW}$ is actually maximally open, however.

The footbrake cylinder FBC of the control circuit $CC_{FBC}$ is likewise single-chambered and may be actuated via a footbrake lever 74. The control valve $CV_{RW}$ is connected to a pressure chamber 76 of the footbrake cylinder FBC via a control line 78 and is constructed and operates substantially like the control valve $CV_{FW}$.

The control valve $CV_{RW}$ differs from the control valve $CV_{FW}$ only in that an additional activating chamber 80 is provided at the control chamber-side end of the valve housing, in which activating chamber 80 an activating or integrated piston 82 is slidingly accommodated. A sealing element cooperates with the activating piston 82, which sealing element seals the activating chamber 80 relative to the control chamber 20' of the control valve $CV_{RW}$. The activating piston 82 may act mechanically on the control piston 24' connected in series therewith, if a control pressure has built up in the activating chamber 80. Finally, the activating chamber 80 comprises a connection 84, via which it is connected to a control line 86, which branches off from the control line 72 of the control circuit $CC_{HBC}$, such that the brake circuit at the rear wheel RW may be co-activated via the brake circuit at the front wheel FW, which is characteristic of a semi-integrated brake system.

On the structure of the semi-integrated brake system illustrated in FIG. 1, it should finally be noted that each of the front wheel FW and the rear wheel RW is associated with a speed sensor 88. In addition a pressure sensor 90 is provided in each of the control circuit $CC_{HBC}$, the wheel brake circuit $WBC_{FW}$, control circuit $CC_{FBC}$ and the wheel brake circuit $WBC_{RW}$, to detect the respective pressure for braking pressure control, as will be described in more detail below. The speed sensors 88 and the pressure sensors 90 are electrically connected via control lines 92 with a control unit 94, as are the motors M for the hydraulic pumps 44 and the solenoids 26 of the control valves $CV_{FW}$ and $CV_{RW}$. In relation to the pressure sensors 90 in the control circuits $CC_{HBC}$ and $CC_{FBC}$, it should also be noted at this point that these pressure sensors 90 primarily serve to improve the control quality and, from the point of view of safety, provide continuous leak testing of the control circuits $CC_{HBC}$ and $CC_{FBC}$.

Below, the mode of operation of the semi-integrated brake system will be explained firstly with reference to the components associated with the front wheel FW, i.e. control circuit $CC_{HBC}$, control valve $CV_{FW}$ and wheel brake circuit $WBC_{FW}$.

By pulling on the handbrake lever 66, a pressure builds up in the pressure chamber 70 of the handbrake cylinder HBC which is proportional to the actuation force acting on the handbrake lever 66. This pressure is also applied as control pressure in the hydraulic control circuit $CC_{HBC}$ via the control line 72 to the control chamber 20 of the control valve $CV_{FW}$.

The control pressure present in the control chamber 20 of the control valve $CV_{FW}$ then displaces the control piston 24 to the right in FIG. 1 as a result of the pressurisation of the hydraulic active area of the control piston 24 corresponding to the cross-sectional area of the valve pin and therewith the valve body 16 lying against the control piston 24 under the force of the restoring spring 36 towards the seal seat at the through-hole 14 of the valve piston 12. This hydraulic activation of the control valve $CV_{FW}$ via the hydraulic control circuit $CC_{HBC}$ is the same both in non-muscular-energy-assisted braking and in the absence of non-muscular-energy assistance.

In non-muscular-energy-assisted braking the motor M driving the hydraulic pump 44 is started by the control unit 94 when a predetermined signal pressure detected by means of the associated pressure sensor 90 is exceeded in the hydraulic control circuit $CC_{HBC}$. However, the hydraulic pump 44 could also be operated all the time the motorcycle is in use.

The hydraulic pump 44 then draws the hydraulic fluid in out of the storage tank 48 via the intake line 46 and conveys it via the non-return valve 50 and the hydraulic line 42 into the pressure chamber 10 of the control valve $CV_{FW}$. From the pressure chamber 10 the hydraulic fluid flows via the through-hole 14 in the valve piston 12 through the restriction gap 18 into the outlet chamber 22 and thence via the return line 64 back into the storage tank 48. Since at the start of actuation of the handbrake lever 66, the control piston 24 of the control valve $CV_{FW}$ and thus the valve body 16 are displaced only slightly towards the seal seat at the valve piston 12, such that the restriction gap 18 is almost completely open, the hydraulic pump 44 circulates the hydraulic fluid largely without pressure via the control valve $CV_{FW}$.

The valve body 16 is then pushed via the valve pin of the hydraulically loaded control piston 24 against the force of the restoring spring 36 further towards the seal seat at the valve piston 12, and this with a force which is equal to the product of the control pressure applied in the control chamber 20 by the handbrake cylinder HBC and the hydraulic active area of the control piston 24 determined by the cross-sectional area of the valve pin at the control piston 24. When the valve body 16 approaches the seal seat of the valve piston 12, the restriction gap 18 reduces, whereby the through-flow cross-section for the hydraulic fluid circulated by the hydraulic pump 44 via the hydraulic line 42 and the pressure chamber 10 reduces. As a result, a dynamic pressure is generated in the wheel brake circuit $WBC_{FW}$ upstream of the restriction gap 18 in the direction of circulation of the hydraulic fluid, which dynamic pressure travels via the pressure chamber 10, the hydraulic line 42 and the hydraulic line 52 as far as the pressure chamber 56 of the piston/cylinder arrangement of the brake caliper 54, such that a braking force is applied to the brake disk 62 via the piston 58 of the piston/cylinder arrangement and the brake linings 60.

If it is then desired, in non-muscular-energy-assisted braking, to reduce the braking pressure, the control pressure in the control circuit $CC_{HBC}$ is reduced by releasing the handbrake lever 66 and the control piston 24 of the control valve $CV_{FW}$ travels together with the valve body 16 back into its starting position, thereby enlarging the restriction gap 18, wherein it is loaded against the diminishing control pressure in the control chamber 20 via the valve body 16 by the dynamic pressure of the circulating hydraulic fluid in the pressure chamber 10, which is decreasing due to the enlargement of the restriction gap 18, and the force of the restoring spring 36. When the signal pressure in the control circuit $CC_{HBC}$ falls below a predetermined value, the motor M of the hydraulic pump 44 is optionally switched off, such that circulation of the hydraulic fluid is stopped and the braking pressure drops to zero.

If non-muscular-energy assistance is absent for example as the result of failure of the hydraulic pump 44 in the wheel brake circuit $WBC_{FW}$, the necessary residual braking force may be applied via the valve piston 12. The valve body 16 displaced via the hydraulically loaded control piston 24 against the force of the restoring spring 36 over the closing distance of the restriction gap 18 seals the through-hole 14 in the valve piston 12 hydraulically at the seal seat, such that through further displacement of the sealed valve piston 12 via the valve body 16 and the control piston 24 a residual braking pressure is generated in the pressure chamber 10. The residual braking pressure travels via the hydraulic line 52 to the piston/cylinder arrangement of the brake caliper 54, such that a residual braking force may be applied to the brake disk 62 via the piston 58 and the brake linings 60.

In the case of an antilock braking system (ABS), the control valve $CV_{FW}$ operates as follows.

The principle of an antilock braking system is that, if a given deceleration threshold at a braked wheel is exceeded during braking using the available braking pressure, the wheel braking pressure is reduced until deceleration at this wheel falls below a second deceleration threshold. For this it may be necessary to reduce the wheel braking pressure used to zero. Thereafter, the wheel braking pressure is increased again until either the wheel is overbraked again or the braking pressure set by the driver is reached. This is achieved in that the control piston 24 of the control valve $CV_{FW}$ may be additionally electromagnetically activated via the armature thereof and the solenoid 26.

If, in the case of ABS, the wheel braking pressure applied to the brake caliper 54 via the wheel brake circuit $WBC_{FW}$ overbrakes the front wheel FW, this is detected in a manner known per se by means of the above-described sensor system. The braking pressure is then suitably adjusted by activation of the solenoid actuator consisting of control piston armature and solenoid 26. The magnetic force here acts on the armature of the control piston 24 leftwards in FIG. 1 and thus contrary to the hydraulic force acting on the control piston 24. The resultant force, the action of which passes rightwards in FIG. 1 from the control piston 24 via the valve pin thereof to the valve body 16, is thus reduced. In an extreme case, the resultant force may be reduced to zero, by making the magnetic force so great due to continuously adjustable application of current to the solenoid 26 that it compensates the force at the control piston 24 applied by the hydraulic control pressure. Consequently, the valve body 16 loaded by the restoring spring 36 and the available dynamic pressure is forced leftwards in FIG. 1 away from the seal seat at the valve piston 12 and the restriction gap 18 is enlarged. As a result, the dynamic pressure applied to the pressure chamber 56 of the brake caliper 54 via the hydraulic line 52 is reduced, until deceleration falls below the deceleration threshold.

Electromagnetic activation of the control valve $CV_{FW}$ is then reduced, such that the resultant force, the action of which passes rightwards in FIG. 1 from the control piston 24 via the valve pin thereof to the valve body 16, increases again. Consequently, the valve body 16 is forced to the right in FIG. 1 towards the seal seat at the valve piston 12 and the restriction gap 18 is reduced. The dynamic pressure applied to the pressure chamber 56 of the brake caliper 54 via the hydraulic line 52 is thereby increased again, until the front wheel FW is again overbraked or the restriction gap 18 is again adjusted solely hydraulically as described above via the control circuit $CC_{HBC}$ and a braking force proportional to the actuating force is applied to the brake caliper 54 by the wheel brake circuit $WBC_{FW}$. A control process starts which continues during ABS-controlled braking.

As far as the components of the semi-integrated brake system illustrated in the upper part of FIG. 1 and associated with the rear wheel RW are concerned, i.e. control circuit $CC_{FBC}$, control valve $CV_{RW}$ and wheel brake circuit $WBC_{RW}$, the activating piston 82 likewise activated hydraulically via the control lines 72 and 86 and located in the control valve $CV_{RW}$ pushes the control piston 24' thereof and thus the valve body 16', when the handbrake cylinder HBC is actuated, with simultaneous start-up of the hydraulic pump 44', towards the seal seat at the through-hole 14' of the valve piston 12', such that, by reducing the restriction gap 18', a dynamic pressure is generated in the pressure chamber 10' which is applied to the brake caliper 54'.

If, during braking, both the handbrake cylinder HBC and the footbrake cylinder FBC are actuated, only the greater control pressure of the two generated by pressurisation of the control chamber 20' and force loading via the activating piston 82 becomes active at the control piston 24' of the control valve $CV_{RW}$.

If the braking pressure applied to the brake caliper 54' of the wheel brake circuit $WBC_{RW}$ is so high that the sensor system detects a tendency towards locking at the rear wheel RW, an antilock braking system as described above is brought into play in the wheel brake circuit $WBC_{RW}$. The solenoid actuator consisting of control piston armature and solenoid 26' draws the control piston 24' and thus the valve body 16' away from the seal seat at the valve piston 12' against the control pressure applied to the activating piston 82 in the activating chamber 80, wherein the activating piston 82 travels back in the activating chamber 80 until the dynamic pressure diminishing as a result of the growing valve gap 18' of the control valve $CV_{RW}$ is brought into line with requirements.

From the above description it is clear that the braking pressure applied via the wheel brake circuit $WBC_{RW}$ to the brake caliper 54' at the rear wheel RW may be actively adjusted by applying current to the solenoid actuator of the control valve $CV_{RW}$, consisting of control piston armature and solenoid 26'. How this is effected to achieve optimised brake force distribution at front wheel FW and rear wheel RW will be described in more detail below.

Figure 2:
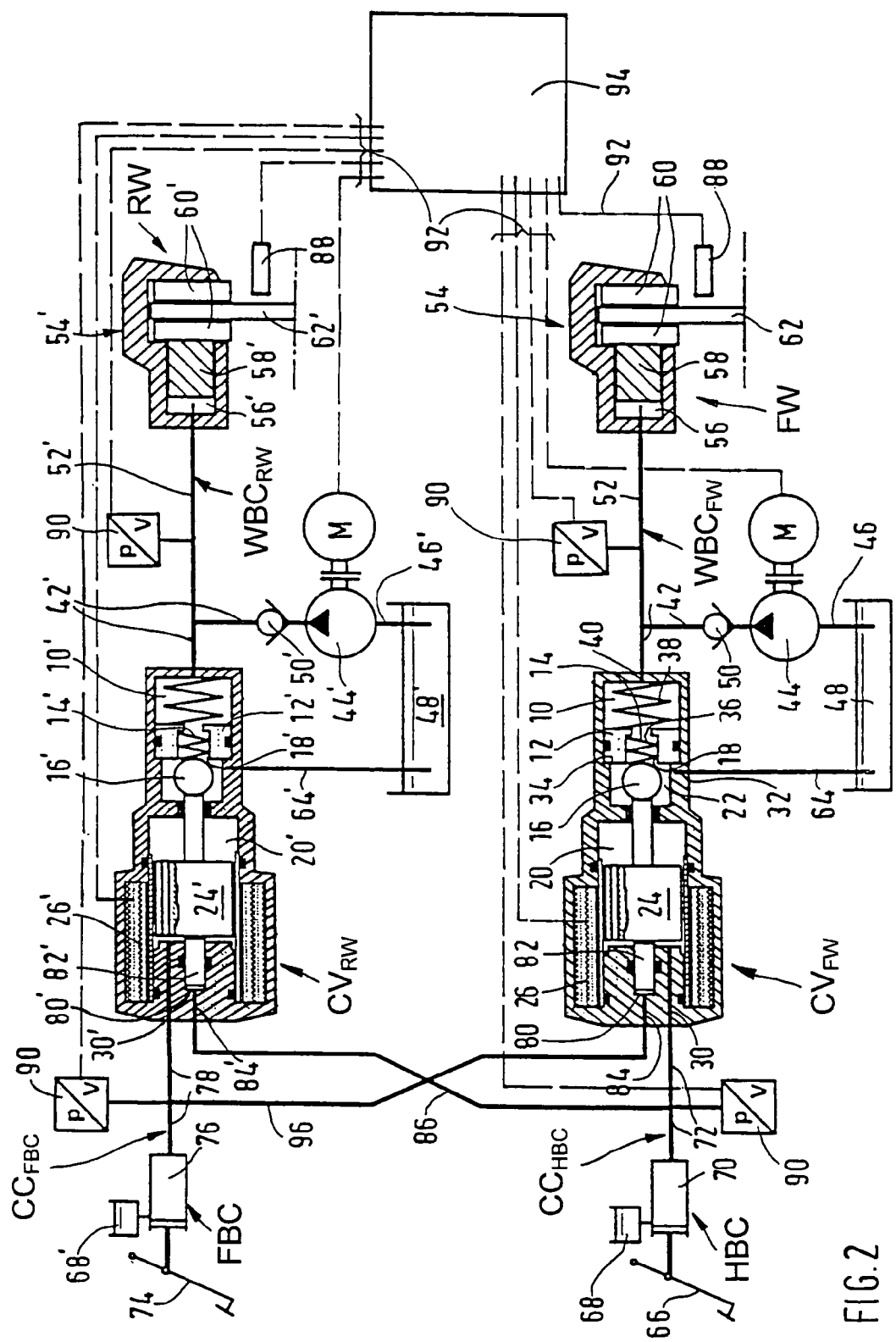
FIG. 2 is a circuit diagram of a hydraulic fully integrated brake system with antilock braking system (ABS) for motorcycles, for implementing the method according to the invention.

FIG. 2 shows the fully integrated brake system in the unactuated state, which will be described below with regard to structure, circuit and function only to the extent to which it differs from the semi-integrated brake system. Similar or corresponding components are again provided with the same reference numerals, in some cases primed.

From a comparison of FIGS. 1 and 2 it is immediately clear that, in the case of the fully integrated brake system, two control valves $CV_{FW}$ and $CV_{RW}$ identical in structure, interconnection and function are used, which correspond to the control valve $CV_{RW}$ of the above-described semi-integrated brake system, i.e. are capable of twofold hydraulic activation (respectively connection 30 or 30' and connection 84 or 84') and onefold electrical activation (solenoid 26 or 26'). Furthermore, in the case of the fully integrated brake system according to FIG. 2, a control line 96 also branches off from the hydraulic control line 78 of the control circuit $CC_{FBC}$, as a development of the semi-integrated brake system according to FIG. 1, which control line 96 is connected to the control connection 84 of the control valve $CV_{FW}$. As a result, when the handbrake cylinder HBC is actuated, not only the control chamber 20 and thus the control piston 24 of the control valve $CV_{FW}$ associated with the wheel brake circuit $WBC_{FW}$ for the front wheel FW but also the activating chamber 80' and thus, via the activating piston 82', the control piston 24' of the control valve $CV_{RW}$ associated with the wheel brake circuit $WBC_{RW}$ for the rear wheel RW are loaded hydraulically. On the other hand, when the footbrake cylinder FBC is actuated, not only the control chamber 20' and thus the control piston 24' of the control valve $CV_{RW}$ associated with the wheel brake circuit $WBC_{RW}$ for the rear wheel RW but also the activating chamber 80 and thus, via the activating piston 82, the control piston 24 of the control valve $CV_{FW}$ associated with the wheel brake circuit $WBC_{FW}$ for the front wheel FW are hydraulically loaded. In other words, either gripping the handbrake lever 66 or stepping on the footbrake lever 74 is sufficient for joint activation of front and rear wheel brake.

Since, as the braking rate increases, the transmittable braking force of the rear wheel RW reduces (braking dynamics) until the rear wheel RW in an extreme case loses contact with the ground, the braking pressure in the wheel brake circuit $WBC_{RW}$ for the rear wheel RW is reduced according to an ideal brake force distribution, i.e. an ideal division of the braking force between front wheel FW and rear wheel RW, both in the case of the above-described semi-integrated brake system and the fully integrated brake system described thereafter, via the solenoid actuator of the control valve $CV_{RW}$ consisting of control piston armature and solenoid 26', as will be described in more detail below.

In the case of the method now described for controlling the braking force at the wheels FW, RW of a motorcycle, it is assumed that, for the best possible utilisation of tyre/ground grip during braking of the motorcycle, both wheels FW, RW have to apply braking forces corresponding as far as possible to their dynamic wheel loads, wherein adaptation of these braking forces to the respective dynamic wheel loads is a difficult task which should not be left to the driver of the motorcycle, especially since it is more problematic for motorcycles than for other motor vehicles (ratio of centre of gravity height to wheel base, risk of falling). In other words, the influences which vary during a journey cycle are automatically compensated by appropriate control of the brake force distribution between front wheel FW and rear wheel RW, in order for each braking operation to be performed close to the ideal characteristic, which means uniform utilisation of the grip present in each case between tyre and ground under the respective conditions. To this end, essentially, power is applied to the control valve $CV_{RW}$ arranged in the above-described semi-integrated or fully integrated brake system in the wheel brake circuit $WBC_{RW}$ for the rear wheel RW as a function of the braking pressure $p_{FWactual}$ measured as a reference input variable by means of the pressure sensor 90 in the wheel brake circuit $WBC_{FW}$ for the front wheel FW, on the basis of a predetermined brake force distribution characteristic stored in the control unit 94 of the brake system, in order to subject the wheels FW, RW of the motorcycle to uniform grip utilisation right at the start of braking. At the same time, the load status of the motorcycle is also taken into account. Optionally, the temperature evolution in particular at the brake disk 62' at the rear wheel RW may also be taken into account in controlling the braking pressure in the wheel brake circuit $WBC_{RW}$ for the rear wheel RW.

The procedure involved in controlling the brake force distribution is explained in more detail below with reference to FIGS. 3 to 8, wherein it should firstly be stated that the above-described ABS control takes place at each wheel FW, RW fundamentally independently of brake force distribution control. If a wheel FW, RW is under ABS control, optimum utilisation of the grip between tyre and ground is already achieved at this wheel FW, RW. The control loops now to be described are run through over a period of 8 ms.

Figure 3:
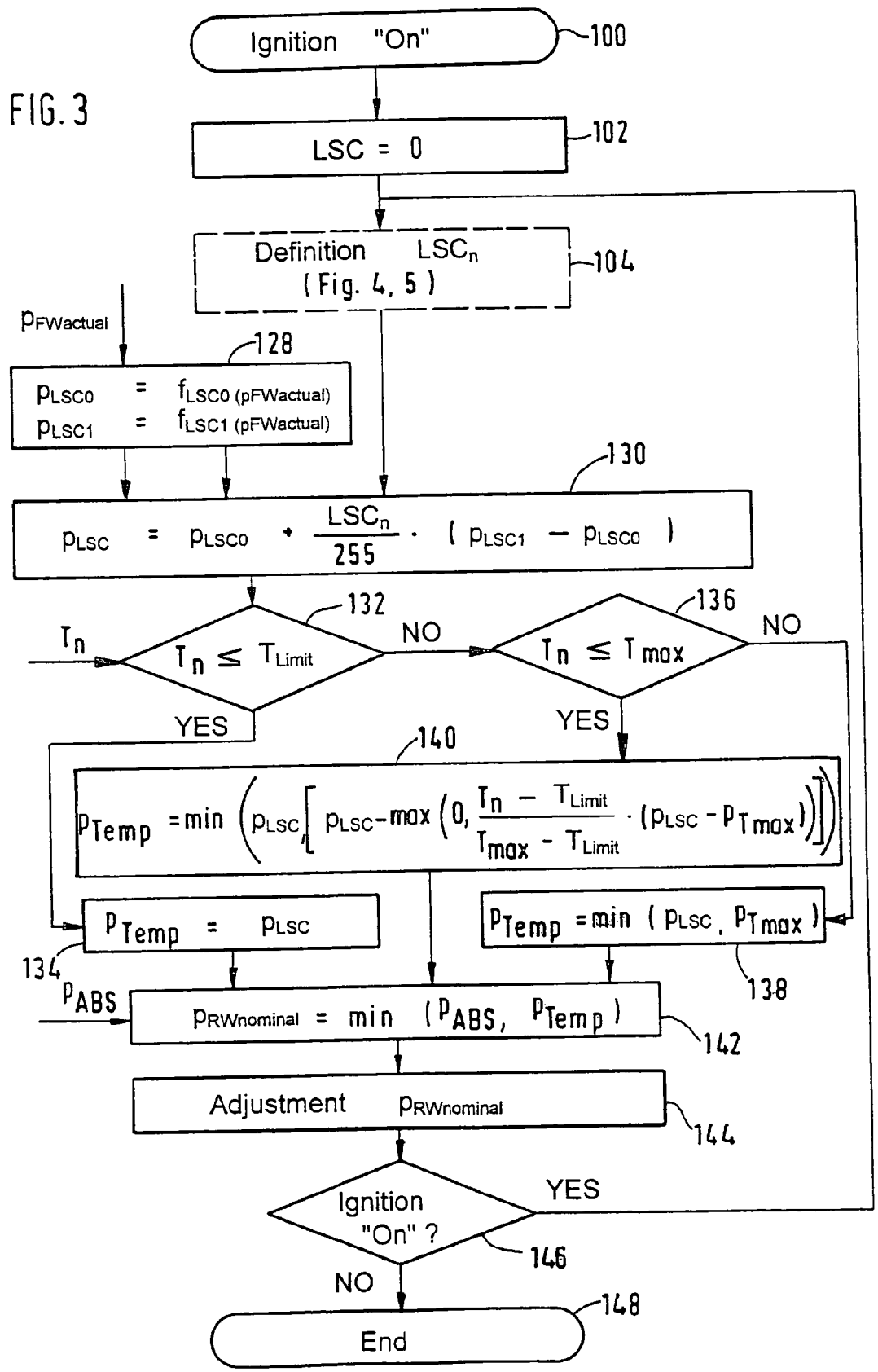
FIG. 3 is a flow chart applicable equally to a semi-integrated brake system and a fully integrated brake system, which shows how the nominal pressure is determined according to the invention for the rear wheel brake circuit as a function of the actual pressure in the front wheel brake circuit.

According to FIG. 3, once the ignition has been turned on in step 100, an integer counter LSC, which may amount to between 0 and 255 and constitutes a measure of the loading of the motorcycle, is firstly set to zero in step 102. The counter $LSC_n$ is then defined at 104 for the respective control loop n. This is illustrated in more detail in FIG. 4 with regard to the semi-integrated brake system according to FIG. 1 and in FIG. 5 with regard to the fully integrated brake system according to FIG. 2.

Figure 4:
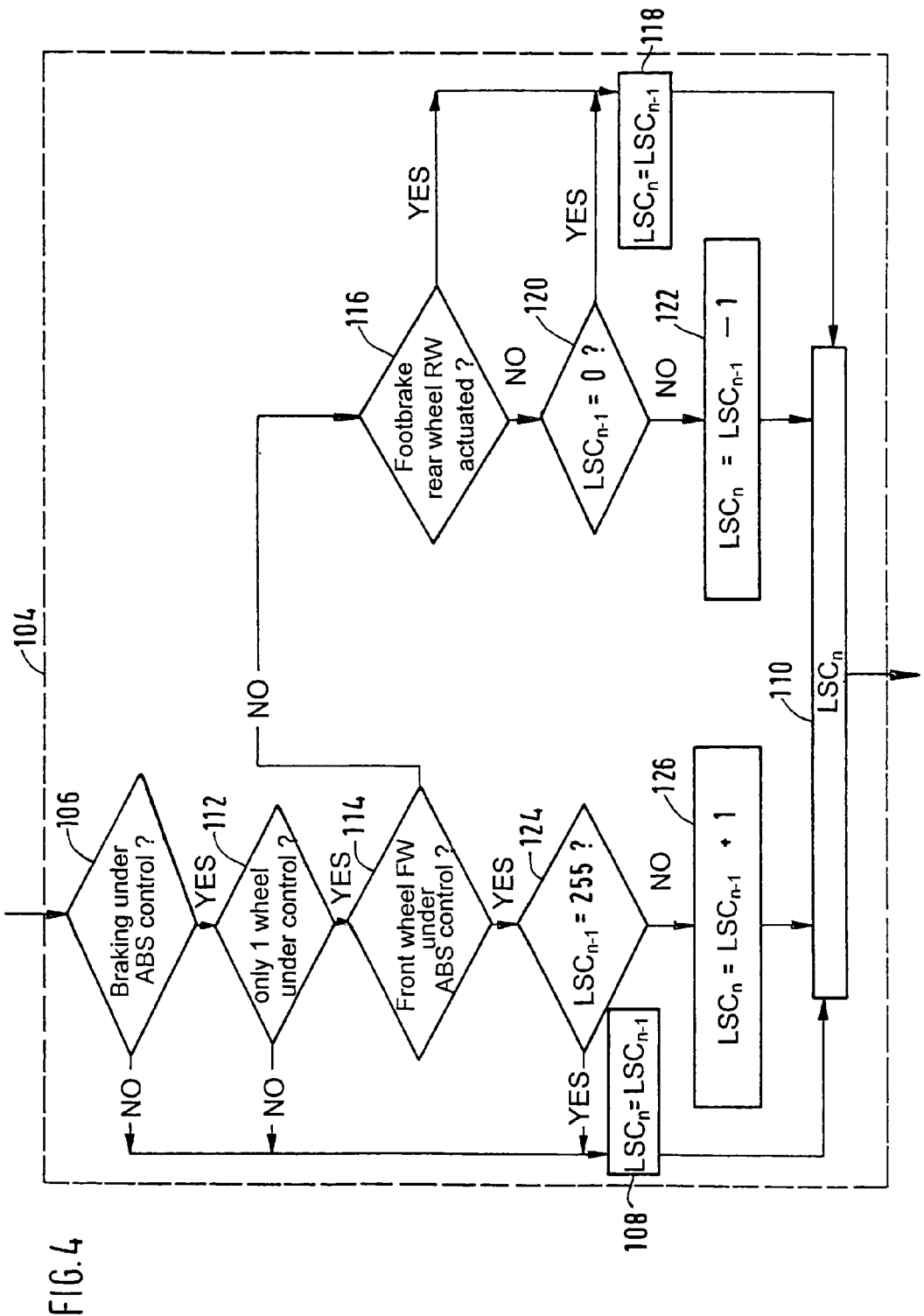
FIG. 4 is a flow chart which shows, for a semi-integrated brake system, how the load status of the motorcycle is taken into account in determining according to FIG. 3 the nominal pressure for the rear wheel brake circuit.

As FIG. 4 shows, when the counter LSC is defined, first of all in step 106 the inquiry is made as to whether braking with ABS control is present. If the answer is negative, in step 108 the counter $LSC_n$ of the current control loop n is set to the same value as the counter $LSC_{n-1}$ of the last control loop n-1 and definition of the counter $LSC_n$ is terminated for this control loop n at 110.

If braking with ABS control is present in step 106, the next stage is to check in step 112 whether only one wheel is under ABS control. If the answer is negative, i.e. if both wheels are under ABS control, the counter $LSC_n$ of the current control loop n is again set to the same value as the counter $LSC_{n-1}$ of the last control loop n-1 in step 108 and definition of the counter $LSC_n$ is terminated for this control loop n at 110. In this respect, it may be noted that, if no wheel is under ABS control or both wheels are under ABS control, the load status counter LSC does not undergo any change.

If only one wheel is under ABS control, it is checked in step 114 whether this is the front wheel FW. If the answer to this is negative, i.e. it has to be the rear wheel RW, step 116 follows, which involves checking whether the footbrake is actuated for the rear wheel RW. If the answer is positive, in step 118 the counter $LSC_n$ of the instantaneous control loop n is set to the same value as the counter $LSC_{n-1}$ of the last control loop n-1 and definition of the counter $LSC_n$ is terminated for this control loop n at 110.

If step 116 reveals that the footbrake is not actuated for the rear wheel RW, step 120 checks whether the counter $LSC_{n-1}$ of the preceding control loop n-1 amounts to zero. If the result is positive, in step 118 the counter $LSC_n$ of the current control loop n is again set to the same value as the counter $LSC_{n-1}$ of the last control loop n-1 and definition of the counter $LSC_n$ is terminated at 110 for this control loop n.

If the counter $LSC_{n-1}$ of the last control loop n-1 in step 120 is different, i.e. greater than zero, the counter $LSC_n$ of the current control loop n is calculated from the relationship indicated in step 122, i.e. the counter LSC is reduced or counted down by one, and definition of the counter $LSC_n$ is terminated at 110 for this control loop n.

If step 114 on the left-hand side of FIG. 4 has revealed that the front wheel FW is under ABS control, it is checked in step 124 whether the counter $LSC_{n-1}$ of the preceding control loop n-1 has a value of 255, i.e. has already reached the upper limit of the counter LSC. If the result is positive, in step 108 the counter $LSC_n$ of the current control loop n is set to the same value as the counter $LSC_{n-1}$ of the last control loop n-1 and definition of the counter $LSC_n$ is terminated at 110 for this control loop n.

If, in step 124, the counter $LSC_{n-1}$ has not yet reached the value 255, the counter $LSC_n$ of the current control loop n is calculated from the relationship indicated in step 126, i.e. the counter LSC is increased or counted up by one, and definition of the counter $LSC_n$ is terminated at 110 for this control loop n.

Figure 5:
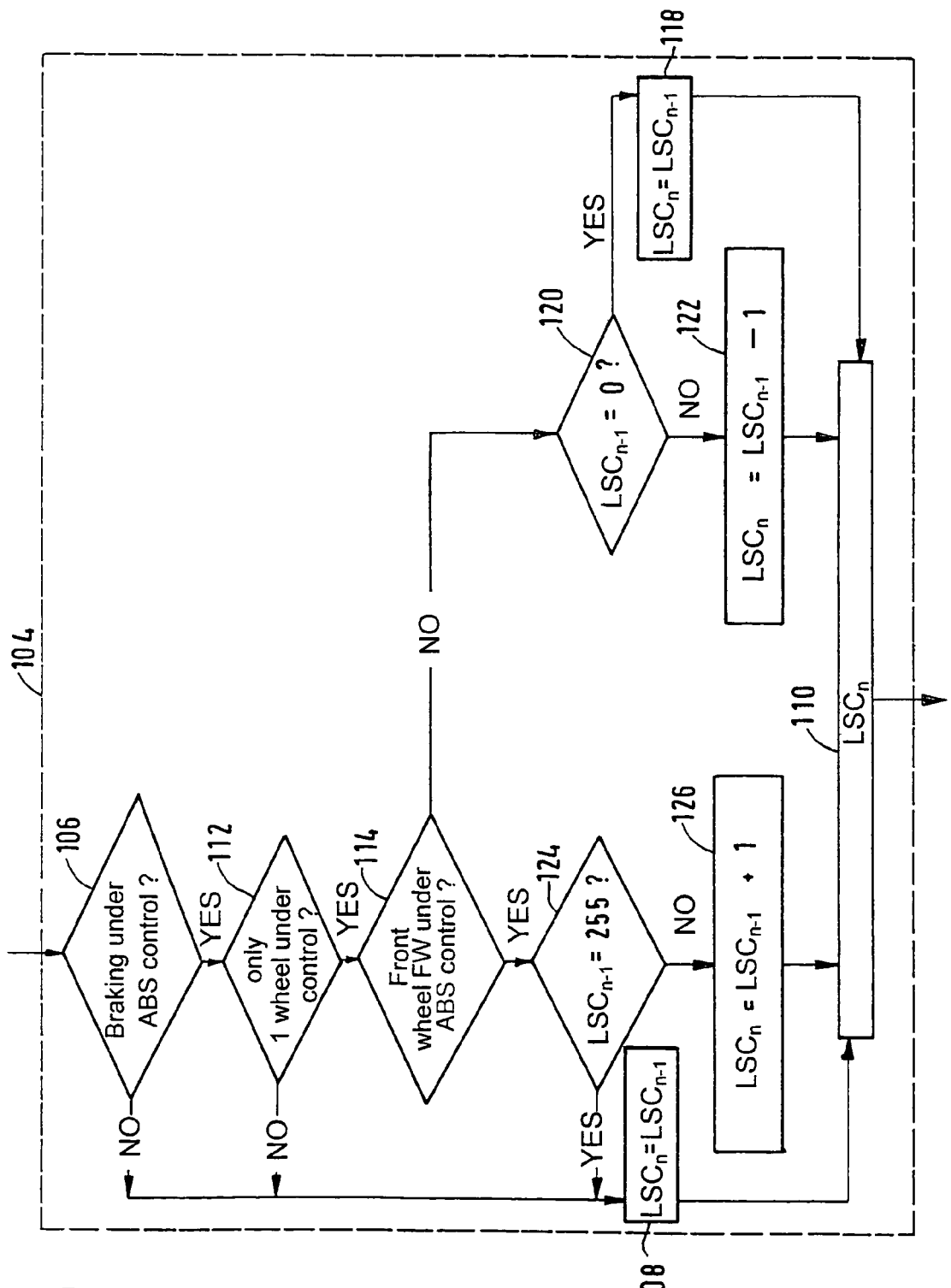
FIG. 5 is a flow chart which shows, for a fully integrated brake system, how the load status of the motorcycle is taken into account in determining according to FIG. 3 the nominal pressure for the rear wheel brake circuit.

FIG. 5, which relates to the fully integrated brake system, corresponds to FIG. 4, which relates to the semi-integrated brake system, except for the fact that in FIG. 5 no inquiry according to step 116 is performed.

With the counter $LSC_n$ thus obtained for the current control loop n, the procedure continues in accordance with FIG. 3. In parallel with definition of the counter $LSC_n$ in step 104, the instantaneous actual value $p_{FWactual}$ of the braking pressure applied to the pressure chamber 56 of the brake caliper 54 is detected by means of the pressure sensor 90 in the wheel brake circuit $WBC_{FW}$ for the front wheel FW of the semi-integrated brake system or the fully integrated brake system. This braking pressure value $p_{FWactual}$ serves as a reference input variable or an essential input value for further brake force distribution control.

Figure 6:
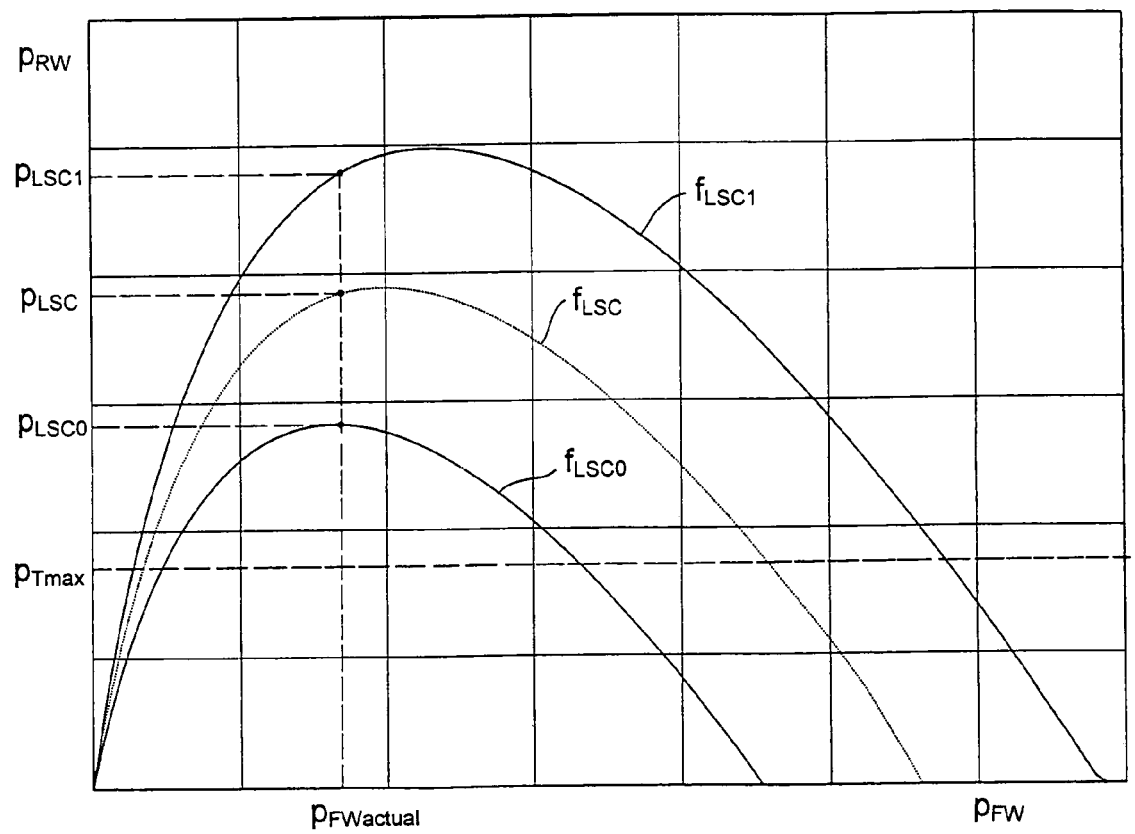
FIG. 6 is a diagram serving to explain the method according to the invention, in which the pressure in the rear wheel brake circuit is plotted as a function of the pressure in the front wheel brake circuit, wherein ideal brake force distribution curves are indicated for a motorcycle without load or with a basic load and for a maximally loaded motorcycle, between which an ideal brake force distribution curve for a given load condition is shown in dotted lines.

In step 128 the pressure calculation variables $p_{LSC0}$ and $p_{LSC1}$ are determined as a function $f_{LSC0}$ or $f_{LSC1}$ of the actual value $p_{FWactual}$ for the braking pressure at the front wheel FW. On this point, reference is made to FIG. 6. In FIG. 6, the braking pressure $p_{RW}$ at the rear wheel RW is plotted as a function of the braking pressure $p_{FW}$ at the front wheel FW; the braking force at the rear wheel RW could likewise be plotted here as a function of the braking force at the front wheel FW (pressure and force behave proportionally relative to one another). This diagram shows two curves or functions $f_{LSC0}$ and $f_{LSC1}$, these being curves representing ideal brake force distribution for various load statuses of the motorcycle. Thus, each point of these curves relates to a given braking pressure $p_{FW}$ at the front wheel FW a given braking pressure $p_{RW}$ at the rear wheel RW, at which optimum utilisation of the grip between tyre and ground is present. The curve $f_{LSC0}$ is the vehicle-specific curve of ideal brake force distribution for the empty, i.e. unladen motorcycle. This curve $f_{LSC0}$ may, however, also include a basic load, for example a driver. The curve $f_{LSC1}$, on the other hand, represents the vehicle-specific curve of ideal brake force distribution for the full, i.e. maximally loaded motorcycle. The curves $f_{LSC0}$ and $f_{LSC1}$ are determined in vehicle-specific manner inter alia by performing road tests and are stored electronically (EPROM) in the control unit 94 of the semi-integrated or fully integrated brake system, for example in the form of a plurality of interpolation points, wherein intermediate values may be mathematically interpolated. The vertical spacing of the curves $f_{LSC0}$ and $f_{LSC1}$ is treated in the computer as 1 byte, with a number accordingly of 256 sub-steps between the curves $f_{LSC0}$ and $f_{LSC1}$.

For the actual value $p_{FWactual}$ detected in the respective control loop n for the braking pressure at the front wheel FW, in step 128 the pressure calculation variables $p_{LSC0}$ and $p_{LSC1}$ related via the curves $f_{LSC0}$ or $f_{LSC1}$ and taking account of the load status of the motorcycle are thus determined from the above-described brake force distribution characteristic stored in the control unit 94 of the brake system. FIG. 6 shows this by means of the vertically extending, broken line: the respective pressure calculation variable $p_{LSC0}$ and $p_{LSC1}$ is associated with the respective point of intersection of this line, the position of which results from the detected actual value $p_{FWactual}$ for the braking pressure at the front wheel FW, with the curve $f_{LSC0}$ or $f_{LSC1}$.

Thus the counter $LSC_n$ together with the pressure calculation variables $p_{LSC0}$ and $p_{LSC1}$ serve as input variables for the next control step 130. In step 130 a pressure calculation variable $p_{LSC}$, which is representative of the load status of the motorcycle, is calculated from these variables by means of the calculation rules indicated in FIG. 3. In accordance with these calculation rules, in FIG. 6 the curve $f_{LSC}$ is more or less displaced upwards between the curves $f_{LSC0}$ and $f_{LSC1}$ as the counter $LSC_n$ increases, while the curve $f_{LSC}$ is displaced downwards between the curves $f_{LSC0}$ and $f_{LSC1}$ as the counter $LSC_n$ decreases. If the counter $LSC_n$ remains constant in the current control loop n, no displacement of the curve $f_{LSC}$ takes place. It is clear from the above and FIGS. 4 and 5 that displacement of the curve $f_{LSC}$—insofar as this is still possible in the upwards or downwards direction (steps 120 and 124: the displacement limits are formed by the curves $f_{LSC0}$ and $f_{LSC1}$)—occurs only when one of the wheels FW, RW is under ABS control. If neither of the wheels FW, RW is under ABS control or both wheels FW, RW are under ABS control, displacement of the curve $f_{LSC}$ does not take place. In other words, in the case of ABS control of only one of the wheels FW, RW, the brake force distribution between the curves $f_{LSC0}$ and $f_{LSC1}$ is changed in such a way, as triggering circumstance, that both wheels FW, RW come under ABS control, such that the grip between tyre and ground is utilised optimally to achieve the best possible deceleration or the shortest possible braking distance. The two wheels FW, RW are also released only jointly from ABS control.

The displacement or adaptation of the brake force distribution curve to the ideal characteristic curve becomes relevant in practice for example during braking into sharp bends or curves, wherein neutral cornering behaviour may be achieved, i.e. the same sideslip angle variations at front and rear axle. Thus, the best utilisation of cornering forces is also ensured and vehicle behaviour which is surprising to the driver is avoided. The same applies at high speed.

In the next steps of the method illustrated in FIG. 3, the temperature of the brake disk 62' at the rear wheel RW is taken into account. The temperature of the brake disk 62' at the rear wheel RW may be taken into account in the procedure described here, but this is not essential. The temperature $T_n$ of the brake disk 62' at the rear wheel RW serves as input variable for this process, which may also be designated temperature compensation. This may in principle be measured on a current basis by means of a suitable sensor system (temperature sensor), but in the method example described here is calculated using a temperature model which will be described in more detail below with reference to FIGS. 7 and 8.

The aim and purpose of temperature compensation is to make driving safer. Although in principle the braking forces at the rear wheel are not so very great in the case of a motorcycle in particular due to the larger differences in axle loads compared to multi-track vehicles, driving situations do arise, e.g. on long downhill journeys, in which the driver may load the rear wheel brake excessively. It is intended to counter automatically the possible functional impairments this may entail, so as to be assist the driver in this situation. In principle, temperature compensation with regard to the brake disk at the front wheel would also be possible. The brake disk(s) at the front wheel is(are) fundamentally more safely designed and not covered by shrouds and thus lie(s) in the cooling airflow.

Coming back to FIG. 3, step 132 checks whether the current temperature $T_n$ of the rear wheel brake disk 62' is below or matches a given limit temperature $T_{limit}$. The limit temperature $T_{limit}$ is a fixed value, which inter alia takes into account a critical temperature of the brake fluid. If the checking result is positive, there is no need for temperature compensation and the pressure calculation variable $p_{Temp}$ is set in step 134 to the same value as the previously determined pressure calculation variable $p_{LSC}$.

If the check performed in step 132 reveals that the temperature $T_n$ is higher that the limit temperature $T_{limit}$, step 136 checks whether the temperature $T_n$ is lower than or equal to a maximum temperature $T_{max}$. The maximum temperature $T_{max}$ is a fixed value, which must not be exceeded for design reasons, to prevent hot fading.

If the temperature $T_n$ is above the maximum temperature $T_{max}$, the braking pressure at the rear wheel RW must clearly be limited. In step 138, the pressure calculation variable $p_{Temp}$ is then set to the same value as the minimum value of the above pressure calculation variable $p_{LSC}$ and a pressure value $p_{Tmax}$. $p_{Tmax}$ according to FIG. 6 is a fixed pressure value related to the maximum temperature $T_{max}$, which fixed pressure value is relatively low and at which, were it to be applied to the rear wheel brake 54', further warming of the brake disk 62' would not be expected.

If the check performed in step 136 reveals that the temperature $T_n$ is still below the maximum temperature $T_{max}$, i.e. is between the limit temperature $T_{limit}$ and the maximum temperature $T_{max}$, the algorithm indicated in step 140 is implemented.

Accordingly, the pressure calculation variable $p_{Temp}$ is set to the same value as the minimum value of the above pressure calculation variable $p_{LSC}$ and the term in square brackets in step 140. The term in square brackets produces either the above pressure calculation variable $p_{LSC}$ or a pressure value which is smaller than the pressure calculation variable $p_{LSC}$. It is clear that the difference between the temperature $T_n$ and the limit temperature $T_{limit}$ is related as a ratio to the difference between the maximum temperature $T_{max}$ and the limit temperature $T_{limit}$ and this ratio is then multiplied with the difference between the pressure calculation variable $p_{LSC}$ and the pressure value $p_{Tmax}$. In other words, the pressure calculation variable $p_{LSC}$ is reduced in a predetermined manner as a function of the temperature $T_n$ together with the interval between the pressure calculation variable $p_{LSC}$ and the pressure value $p_{Tmax}$. The result is a defined reduction in braking pressure, with the purpose of keeping the temperature of the rear wheel brake disk 62' within predetermined limits.

In addition to the pressure calculation variable $p_{Temp}$ now determined, the ABS control-determined pressure value $p_{ABS}$ then serves as input variable for step 142, which pressure value $p_{ABS}$ would require setting during ABS control at the brake caliper 54' via the control valve $CV_{RW}$ in the wheel brake circuit $WBC_{RW}$ of the rear wheel RW. In step 142, the smaller value of the pressure value $p_{ABS}$ and the pressure calculation variable $P_{Temp}$ is fixed as the nominal value $p_{RWnominal}$ for the braking pressure at the rear wheel RW. With this approach, if the temperature evolution at the brake disk 62' at the rear wheel RW requires it, the optimum utilisation of the grip between tyre and ground, possible as a result of ABS control, is set aside in favour of defined cooling of the brake disk 62' at the rear wheel RW. This step 142 could also be omitted, depending on the respective requirements, but is preferably provided here.

In step 144, the determined nominal value $p_{RWnominal}$ for the braking pressure at the rear wheel RW is then adjusted by means of the control valve $CV_{RW}$ in the wheel brake circuit $WBC_{RW}$ of the rear wheel RW by appropriate application of power to the solenoid 26', as described in detail with reference to FIGS. 1 and 2.

Provided that it is finally established in step 146 that the ignition is still at "ON", i.e. is turned on, the next control loop begins with step 104 and thus the definition of the counter $LSC_n$ in accordance with FIGS. 4 and 5. If the ignition has been turned off, the control process is terminated at 148.

Finally, the temperature model will be described with reference to FIGS. 7 and 8 which is preferably used to calculate the temperature $T_n$ of the brake disk 62' at the rear wheel RW.

Once the ignition has been turned "ON" at 150, first of all the starting values are set in step 152 for two temperature functions $F_1$ and $F_2$ shown in FIG. 8, which are always calculated jointly. Merely for the sake of clarity, the left-hand side of FIG. 8 shows only the temperature function $F_1$.

In step 154, calculation is then performed of the temperature function $F_1$, wherein a temperature value $T_{alm}$ of the current control loop n is obtained from the indicated relationship, in which the following variables are calculated (variables which are already known are not listed again):

Δt=time interval during which energy is supplied to the brake disk 62' or removed from the brake disk 62'.

v=speed of the vehicle, which may be determined from the signals of the speed sensor 88, preferably at the front wheel FW.

$K_1$=a constant determined by road tests, which is representative of the heating up of the brake disk 62' as a consequence in particular of the applied mechanical frictional energy.

$K_2$=a constant determined by road tests, which is representative of the cooling down of the brake disk 62' as a consequence in particular of thermal radiation and the airflow therearound.

In step 156, a correction term $K_T$ is next calculated as a function of the temperature values $T_{altn}$ and $T_{n-1}$. The associated calculation formula is as follows:

$$K_T = 1 + k^* \max[0, (T_{altn} - T_{n-1})],$$

wherein k is a constant scaling factor.

In step 158, the temperature $T_n$ is then calculated from the indicated temperature function $F_2$. It is clear that, since $K_T$ is always greater than or equal to 1, this correction term $K_T$ "accelerates" the temperature function $F_2$ or allows it to climb more steeply, until the temperature functions $F_1$ and $F_2$ again extend one on top of the other. The calculated temperature $T_n$ may then be further processed in the control sequence according to FIG. 3 (step 132).

In step 160 the temperature value $T_{altn}$ of the temperature function $F_1$ in the current control loop n is stored as value $T_{sp}$ in the control unit 94, such that it is available for further processing when the ignition has been turned "OFF" and "ON" again.

If the inquiry in step 162 reveals that the ignition is still at "ON", i.e. turned on, a new control loop begins with step 154. Otherwise, the control process is terminated at 164.

Figure 7:
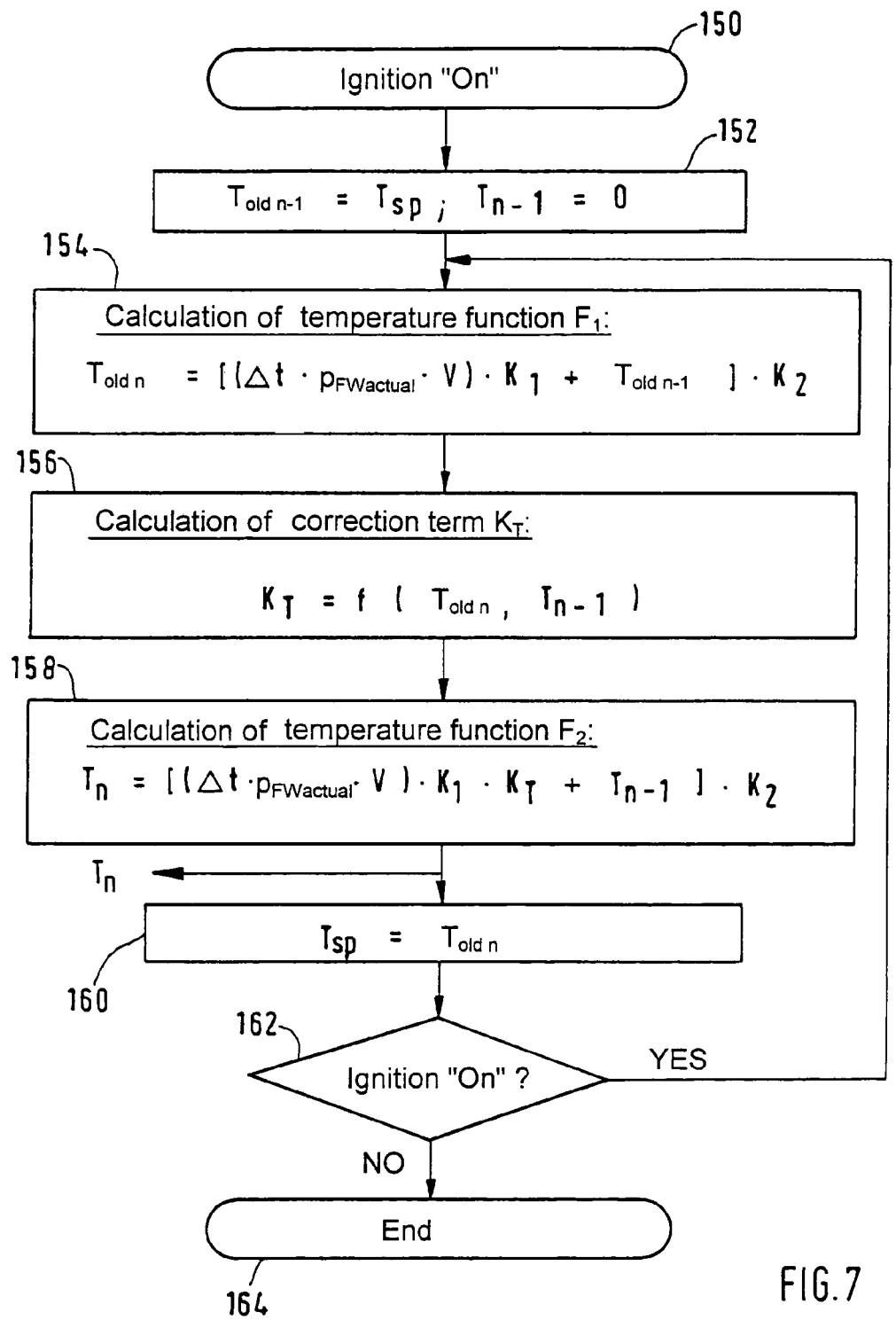
FIG. 7 is a flow chart applicable equally to a semi-integrated brake system and a fully integrated brake system, which shows how the brake disk temperature calculated by means of a temperature model according to the invention is taken into account in determining the nominal pressure in the corresponding wheel brake circuit.

FIG. 8 finally illustrates that, as is already clear from the flowchart according to FIG. 7, during calculation of the temperature of the brake disk 62' with the ignition "ON", the two temperature functions $F_1$, $F_2$ are always produced, of which the one temperature function $F_1$, after the ignition has been turned "OFF" and "ON" again, always starts again at the last calculated temperature value $T_{altn-1} = T_{sp}$, while the other temperature function $F_2$ supplying the recalculated temperature value $T_n$ always starts at zero again when the ignition is turned "ON", wherein the latter calculates the results $T_{altn}$ of the first temperature function $F_1$ in such a way that it rises more sharply until the two temperature functions supply the same results again at $T_x$. The reference numerals w and k indicate by way of example, with regard to the temperature function $F_2$, when energy is supplied (w) to the brake disk 62' and when it is dissipated (k).

The above-described temperature model has on the one hand the advantage that a complex sensor system is not required to detect brake disk temperature. On the other hand, it advantageously manages without electronic components and time buffer elements which would remove power from the battery when the motorcycle was at a standstill. The latter advantage in particular means that this temperature model is also of interest for other applications in which a variable temperature needs to be determined computationally at a body which exhibits warming-up and cooling-down phases.

A method is disclosed of controlling the braking force at the wheels of a single-track vehicle using a brake system which comprises a wheel brake circuit with a pressure modulator for adjusting the braking pressure $p_{FW}$ at a front wheel brake, a wheel brake circuit with a pressure modulator for adjusting the braking pressure $p_{RW}$ at a rear wheel brake, at least one control circuit for activating both pressure modulators and a control unit. According to the invention, the braking pressure $p_{RWnominal}$ in the rear wheel brake circuit is determined as a function of the braking pressure $p_{FWactual}$ detected in the front wheel brake circuit on the basis of an ideal brake force distribution characteristic stored in the control unit and is adjusted by the pressure modulator in the rear wheel brake circuit. As a result, a method is provided which allows the best possible automated utilisation of the grip between tyre and ground during braking. The invention also provides a simply designed brake system for implementing the method.

LIST OF REFERENCE NUMERALS

10 Pressure chamber
12 Valve piston
14 Through-hole
16 Valve body
18 Restriction gap
20 Control chamber
22 Outlet chamber
24 Control piston
26 Solenoid
28 Limit stop
30 Connection
32 Connection
34 Step
36 Restoring spring
38 Piston spring
40 Connection
42 Hydraulic line
44 Hydraulic pump
46 Intake line
48 Storage tank
50 Non-return valve
52 Hydraulic line
54 Brake caliper
56 Pressure chamber
58 Piston
60 Brake lining
62 Brake disk
64 Return line
66 Handbrake lever
68 Equalising reservoir
70 Pressure chamber
72 Control line
74 Footbrake lever
76 Pressure chamber
78 Control line
80 Activating chamber
82 Activating piston
84 Connection
86 Control line
88 Speed sensor
90 Pressure sensor
92 Control line
94 Control unit
96 Control line
100-164 Method steps

The invention claimed is:

1. A method of controlling a braking pressure at a rear wheel brake of a single-track vehicle using a brake system which comprises only one wheel brake circuit with a pressure modulator for adjusting a braking pressure at a front wheel brake, only one wheel brake circuit with a pressure modulator for adjusting the braking pressure at the rear wheel brake, at least one control circuit for activating both pressure modulators and a control unit; wherein a nominal rear wheel braking pressure is determined as a function of an actual front wheel braking pressure detected as a reference input variable in the single wheel brake circuit for the front wheel by means of a pressure sensor, on the basis of an ideal brake force distribution characteristic stored in the control unit, and is adjusted by the pressure modulator in the wheel brake circuit for the rear wheel, taking into account an actual rear wheel braking pressure detected as a control variable in the single wheel brake circuit for the rear wheel by means of a pressure sensor, such that the actual rear wheel braking pressure is reduced according to the ideal brake force distribution characteristic until it fits the determined nominal rear wheel braking pressure, wherein the brake force distribution characteristic stored in the control unit comprises two ideal brake force distribution curves, of which the one curve is representative of an unladen vehicle while the other curve is representative of a vehicle under maximum load, and wherein a counter representative of the actual loading of the vehicle is produced, which, taking account of the two ideal brake force distribution curves, serves in calculating a pressure calculation variable for the actual front wheel braking pressure detected in the wheel brake circuit for the front wheel, which variable lies, in accordance with the actual loading of the vehicle, between or on one of the two ideal brake force distribution curves, wherein the nominal rear wheel braking pressure is determined as a function of the calculated pressure calculation variable.

2. A method according claim 1, wherein a measured or calculated temperature of a rear wheel brake disk is taken into account in determining the nominal rear wheel braking pressure, in such a way that the nominal rear wheel braking pressure is reduced when given temperature limits are exceeded.

3. A method according to claim 2, wherein, during calculation of the temperature of the brake disk with the ignition "ON", two temperature functions are always produced, of which the one temperature function serves as an auxiliary function which, after the ignition has been turned "OFF" and "ON" again, always starts again at the last calculated temperature value, while the other temperature function supplying a temperature value further used always starts at zero again when the ignition is turned "ON", wherein the latter temperature function takes into account the results of the first temperature function in such a way that the latter temperature function rises more sharply until the two temperature functions supply the same results.

4. A method of controlling a braking pressure at a rear wheel brake of a single-track vehicle using a brake system which comprises only one wheel brake circuit with a pressure modulator for adjusting a braking pressure at a front wheel brake, only one wheel brake circuit with a pressure modulator for adjusting the braking pressure at the rear wheel brake, at least one control circuit for activating both pressure modulators and a control unit; wherein a nominal rear wheel braking pressure is determined as a function of an actual front wheel braking pressure detected as a reference input variable in the single wheel brake circuit for the front wheel by means of a pressure sensor, on the basis of an ideal brake force distribution characteristic stored in the control unit, and is adjusted by the pressure modulator in the wheel brake circuit for the rear wheel, taking into account an actual rear wheel braking pressure detected as a control variable in the single wheel brake circuit for the rear wheel by means of a pressure sensor, such that the actual rear wheel braking pressure is reduced according to the ideal brake force distribution characteristic until it fits the determined nominal rear wheel braking pressure, wherein a measured or calculated temperature of a rear wheel brake disk is taken into account in determining the nominal rear wheel braking pressure, in such a way that the nominal rear wheel braking pressure is reduced when given temperature limits are exceeded, and wherein, during calculation of the temperature of the brake disk with the ignition "ON", two temperature functions are always produced, of which the one temperature function serves as an auxiliary function which, after the ignition has been turned "OFF" and "ON" again, always starts again at the last calculated temperature value, while the other temperature function supplying a temperature value further used always starts at zero again when the ignition is turned "ON", wherein the latter temperature function takes into account the results of the first temperature function in such a way that the latter temperature function rises more sharply until the two temperature functions supply the same results.

* * * * *